United States Patent [19]
Lockwood et al.

[11] Patent Number: 5,555,877
[45] Date of Patent: Sep. 17, 1996

[54] COVER FOR POND USED TO COLLECT SOLAR RADIATION

[75] Inventors: George S. Lockwood, P.O. Box 345, Carmel Valley, Calif. 93924-0345; John K. Bethune, Saratoga Springs, N.Y.; Andrew W. Lockwood, Carmel Valley, Calif.

[73] Assignee: George S. Lockwood, Carmel Valley, Calif.

[21] Appl. No.: 49,684

[22] Filed: Apr. 16, 1993

[51] Int. Cl.⁶ .................................................. F24J 2/42
[52] U.S. Cl. ........................... 126/565; 126/561; 126/568; 126/566; 4/498; 4/503; 4/508; 4/499; 4/507
[58] Field of Search .................................. 126/565, 561, 126/564, 566, 568; 4/498, 499, 503, 507, 508

[56] References Cited

U.S. PATENT DOCUMENTS

| | | | |
|---|---|---|---|
| 2,006,985 | 7/1935 | Claude et al. | 122/40 |
| 3,072,920 | 1/1963 | Yellott | 4/172 |
| 3,416,984 | 12/1968 | Chavannes et al. | 156/209 |
| 3,608,099 | 9/1971 | Wall | 4/172.12 |
| 3,620,206 | 11/1971 | Harris et al. | 126/271 |
| 3,815,367 | 6/1974 | Collins et al. | 61/1 |
| 3,871,033 | 3/1975 | Bartlett | 4/172 |
| 3,927,427 | 12/1975 | Aine | 4/172.14 |
| 3,928,145 | 12/1975 | Othmer | 203/11 |
| 4,011,607 | 3/1977 | Davidoff | 4/172.12 |
| 4,028,750 | 6/1977 | Gustafsson | 4/172.12 |
| 4,109,325 | 8/1978 | Shuff | 4/172.12 |
| 4,110,174 | 8/1978 | Carson | 203/11 |
| 4,121,567 | 10/1978 | Carson | 126/271 |
| 4,121,977 | 10/1978 | Carson | 203/11 |
| 4,122,561 | 10/1978 | Barr | 4/172.12 |
| 4,181,986 | 1/1980 | Aine | 4/172.14 |
| 4,313,421 | 2/1982 | Trihey | 126/415 |
| 4,426,995 | 1/1984 | Wilson | 126/426 |
| 4,429,683 | 2/1984 | Hull | 126/415 |
| 4,465,056 | 8/1984 | Elata | 126/415 |
| 4,470,403 | 9/1984 | Lin | 126/415 |
| 4,480,632 | 11/1984 | Klier et al. | 126/568 |
| 4,586,339 | 5/1986 | Reid et al. | 60/641.7 |
| 4,601,072 | 7/1986 | Aine | 4/499 |
| 4,628,549 | 12/1986 | Lazar | 4/498 |
| 4,685,254 | 8/1987 | Terreri | 52/2 |
| 4,790,037 | 12/1988 | Phillips | 4/499 |
| 4,929,124 | 5/1990 | Lockwood | 405/165 |
| 4,953,239 | 9/1990 | Gadsby | 4/499 |
| 4,982,457 | 1/1991 | Donaton | 4/504 |
| 5,025,513 | 6/1991 | Weissner | 4/498 |
| 5,216,762 | 6/1993 | Denny | 126/566 X |

FOREIGN PATENT DOCUMENTS

| 2657244 | 7/1977 | Germany | 126/565 |
|---|---|---|---|

OTHER PUBLICATIONS

"Calculation Procedure for Collectors with a Honeycomb Cover of Rectangular Cross Section", Platzer, *Solar Energy*, vol. 48, No. 6, 1992, pp. 381–393.

"Salt–gradient Solar Ponds for Solar Energy Utilization", Nielsen, *Environmental Conservation*, publication date unavailable, pp. 289–292.

"Heating an Aquaculture Pond with a Solar Pool Blanket", Wisely et al, *Aquaculture*, 26 (1981/1982), pp. 385–387.

"Thermal Behavior of a Small, Saltless Solar Pond with the Semitransparent Multilayer Surface Insulation System", Kamiuto et al, *Solar Energy*, vol. 41, No. 2, 1988, pp. 141–146.

(List continued on next page.)

*Primary Examiner*—Larry Jones
*Attorney, Agent, or Firm*—Christie, Parker & Hale, LLP

[57] ABSTRACT

A cover for withstanding stormy weather and increasing solar heating of a body of water is disposed over the surface of the water. The cover is more transparent to visible radiation from the sun than to infrared radiation, and is anchored and sealed around its periphery over the surface of the body of water. Means are provided for reducing the pressure between the bottom of the cover and the top of the water to subatmospheric, and for flooding the top surface of the cover with a layer of water, and draining the layer of water from the top of the cover.

18 Claims, 6 Drawing Sheets

OTHER PUBLICATIONS

"The Optimum Design of Honeycomb Solar Ponds and a Comparison with Salt Gradient Ponds", Schaefer et al, *Solar Energy*, vol. 48, No. 2, 1992, pp. 69–78.

"Power From the Tropical Seas", Claude, *Mechanical Engineering*, vol. 52, No. 12, Dec. 1930, pp. 1039–1044.

"Thermoclines: A Solar Thermal Energy Resource for Enhanced Hydroelectric Power Production", Nichols et al, publication data not available.

"New Mexico Gel Pond", author not available, *International Solar Pond Newsletter* #4, Jan. 1981, pp. 3–5.

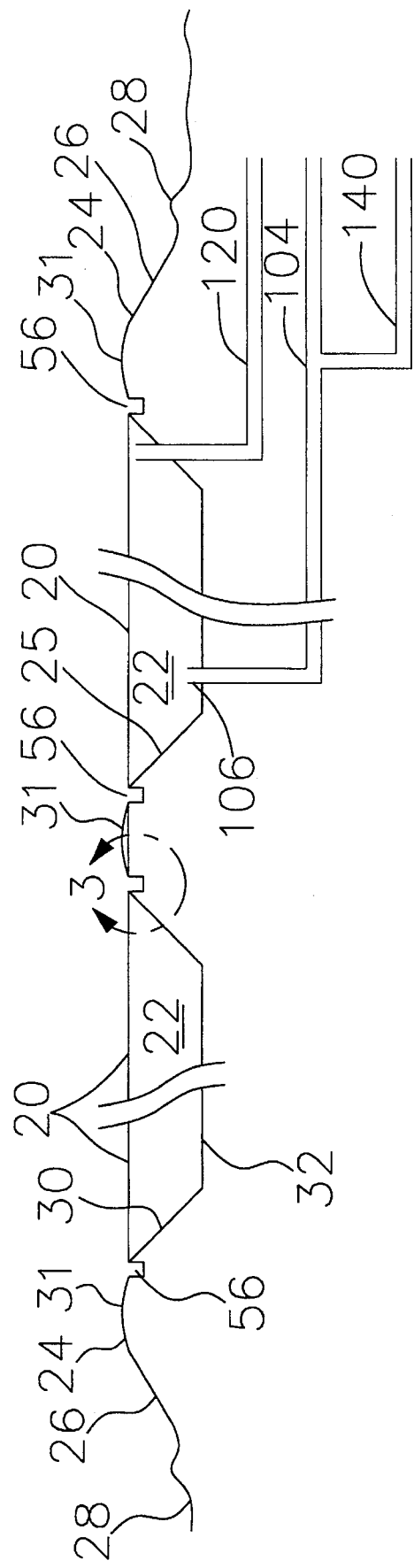

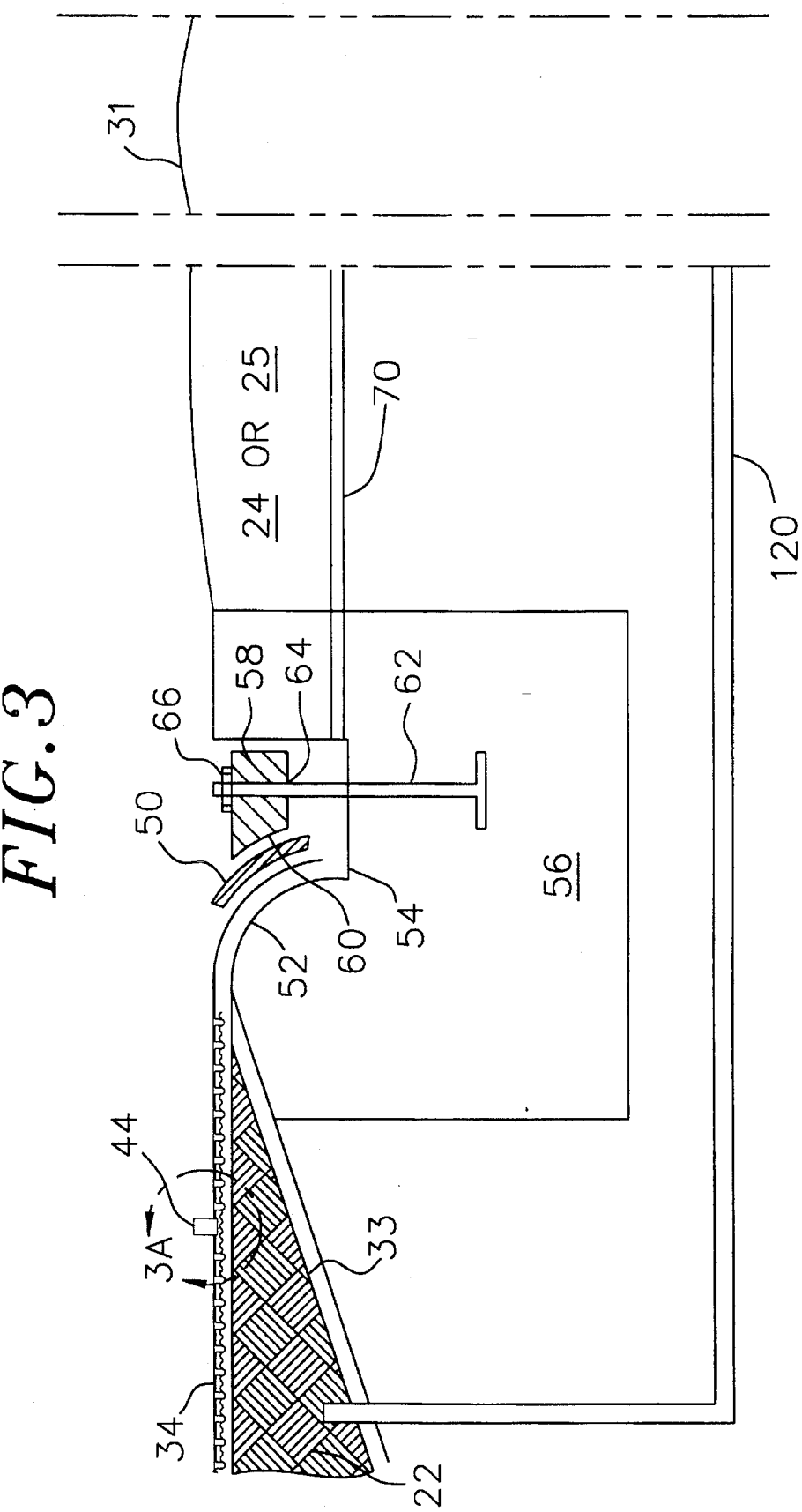

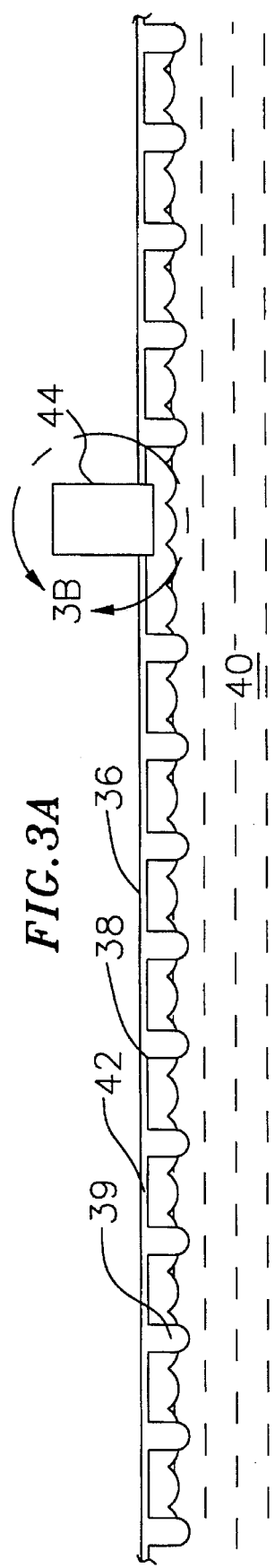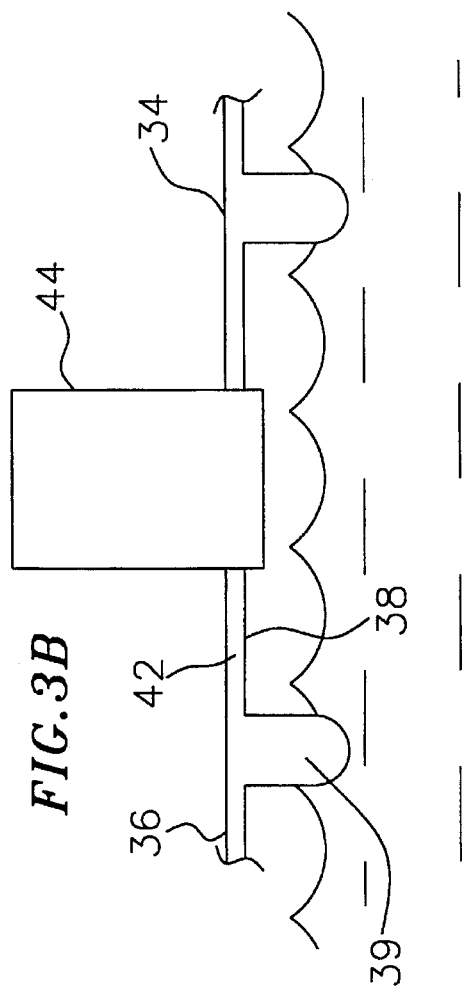

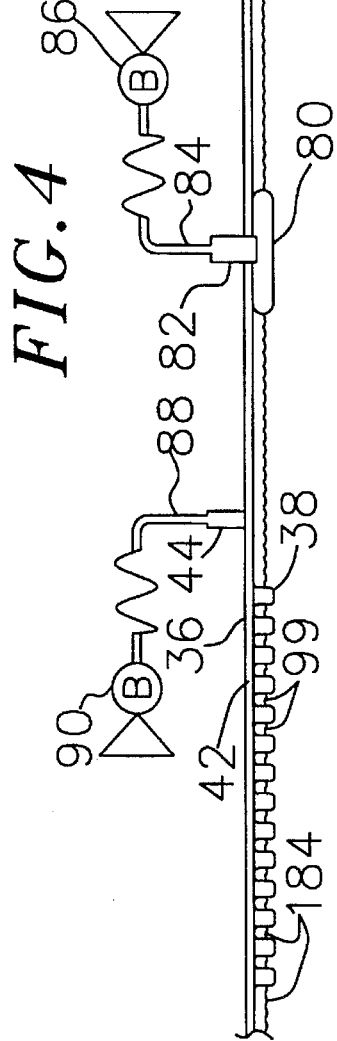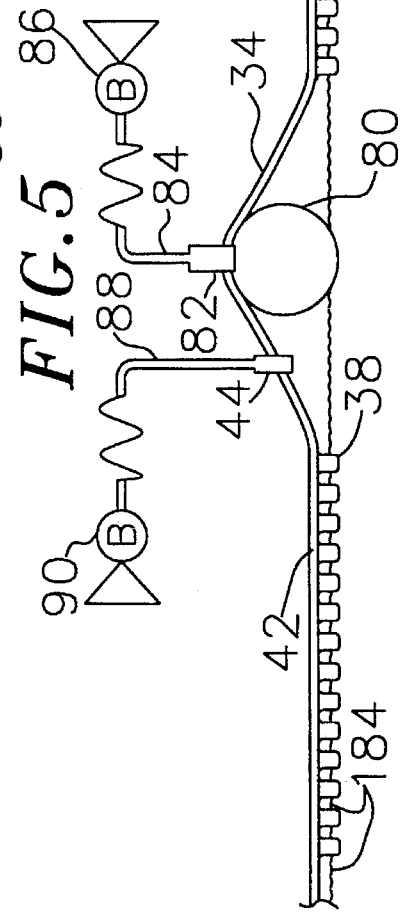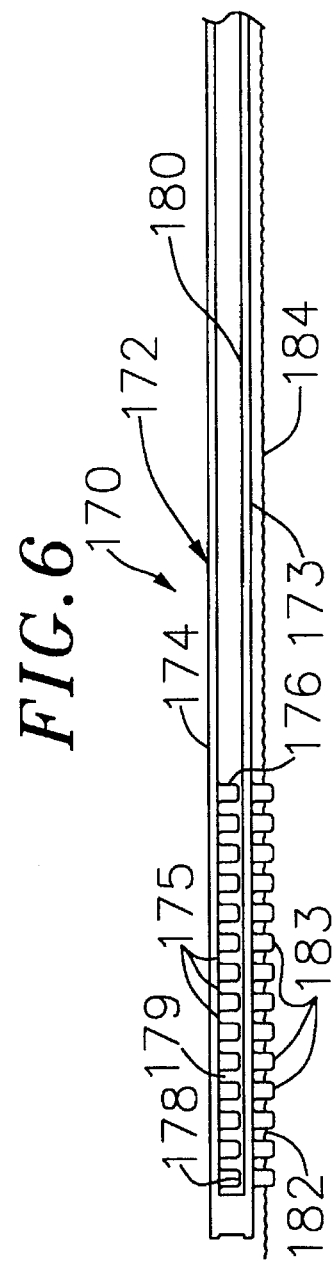

COVER FOR POND USED TO COLLECT SOLAR RADIATION

FIELD OF THE INVENTION

This invention relates to covers for ponds used to collect and retain solar radiation.

BACKGROUND OF THE INVENTION

Since at least as early as 1960, covers have been designed for ponds, swimming pools, and the like to collect solar radiation to heat water. The heated water could be used simply to heat swimming pools to a comfortable temperature, or for generation of power, or other industrial uses. U.S. Pat. No. 3,072,920 to Yellot (1963) discloses a swimming pool cover for collecting solar heat. U.S. Pat. No. 3,620,206 to Harris, Jr. et al (1971) discloses a cover over a liquid reservoir for collecting solar energy which can be used for swimming pools or various industrial purposes.

It has been known since at least 1930 that the difference in temperature of sea water at the surface and greater depths is a source of virtually unlimited energy. U.S. Pat. No. 2,006,985, issued Jul. 2, 1935, to Claude, et al, and the article entitled "Power from the Tropical Seas" (by G. Claude in *Mechanical Engineering*, Vol. 52; No. 12; Dec. 1930) describe a plant for producing electrical energy by using surface sea water at a temperature of about 27° C. and deep sea water at a temperature of about 13° C. The article states that efficiency increases as the square of the difference of temperatures. An article in *Solar Energy*, Vol. 48, No.s 2, pp. 69–78, 1992 by Schaefer, et al, states that the potential thermal energy from deep fresh water reservoirs could be enhanced by a floating honeycomb pond cover. Thus, the efficiency of the Claude plant could be increased by using a covered solar pond which heats the sea surface water to near its boiling point. However, a covered pond will not produce practical amounts of power unless the pond extends over a large area, and the pond cover can withstand the tropical storms which occur in locations well suited for developing energy from the difference between temperature of sea water at the surface and at lower depths.

U.S. Pat. No. 3,928,145 to Othmer (1975) describes improvements over the original Claude process by using sea water that has been heated with solar radiation. Othmer refers to a temperature difference between cold and warm waters to be as great as 70° C. by flowing water through ponds with black bottoms and transparent covers.

U.S. Pat. Nos. 4,110,174 (1978) and 4,121,997 (1978) to Carson disclose improvements to the processes of Claude and Othmer. The Carson improvement includes, among other things, exposing warm sea water to radiant solar energy to further increase the working temperature difference.

However, none of the prior art to date has provided large, efficient, and durable pond covers which can withstand tropical Storms so that energy can be commercially extracted from sea water at different temperatures.

SUMMARY OF THE INVENTION

This invention provides an efficient and durable pond cover which can be used over a wide area, and which can withstand tropical storms likely to occur in those areas where relatively large temperature differences exist between sea water at the surface and at lower depths. In brief, this invention provides a cover for withstanding stormy weather and increasing solar heating of a body of water in a reservoir having a bottom and a side edge extending upwardly from and surrounding the bottom. The cover includes a sheet which is more transparent to visible radiation from the sun than to infrared radiation. The cover also blocks cooling effects due to evaporation, and reduces heat losses from conduction and convection caused by contact with cooler air. Means are provided for anchoring the sheet down around its periphery to the side edge of the reservoir to prevent wind from lifting the sheet from the reservoir. A retaining wall extends above and around the periphery of the sheet. Means are provided for covering the top of the sheet with a layer of water confined by the retaining wall to hold down the cover when exposed to wind. Means are also provided for removing the water from the top of the sheet during calm weather so solar radiation can pass through the sheet and into the water under the cover.

Preferably, the retaining wall is formed by the top of the reservoir edge which surrounds the pond, and extends slightly higher than the cover so the cover can be flooded with water to help hold it down during a storm. Preferably, an upwardly opening channel in the edge surrounding the pond provides convenient means for flooding and draining the area overlying the top of the cover.

The preferred form of the invention also includes means for sealing the sheet around its periphery to the side edge of the reservoir to prevent wind from blowing under the sheet, and means for withdrawing air from under the cover to create subatmospheric pressure under the cover to help hold it down during a storm. This effect is aided by the use of a plurality of one-way check valves extending through the cover to permit air and other fluids, including water, to flow upwardly and out of the space between the cover and the surface of the water in the reservoir. The preferred cover also includes means for lifting and lowering a central portion of the cover out of and into contact with the water surface to facilitate withdrawing air from under the cover and draining water from the top of the cover.

Preferably, the cover is secured in tension around its periphery to the edge of the pool. To this end, the upper inside portion of the edge is curved convex upwardly to receive the periphery of the cover, and an elongated, curved retaining plate is clamped down on the cover periphery to hold it in place. This seals the cover over the pool, and also anchors the cover against being lifted, say, during a windstorm or the like.

In one form of the invention, the top of the edge surrounding the pond is above ground level, and an outer bank slopes downwardly away from the top of the edge at a rate of less than one unit of distance vertically for each four units horizontally. Preferably, the slope is less than about 1 in 5. This provides protection against excessive aerodynamic forces acting on the cover during high wind conditions. The inside pool edge can be of almost any slope that can be economically constructed. Where soil conditions permit efficient excavation, the inside face of the pool edge preferably slopes downwardly and inwardly at the rate of about one unit of vertical height for each two units of horizontal distance.

These and other aspects of the invention will be more fully understood from the following detailed description.

BRIEF DESCRIPTION OF THE DRAWINGS

FIG. 2 is a view taken on line 2—2 of FIG. 1;

FIG. 3 is an enlarged view taken in the area of the arrows 3—3 of FIG. 2;

FIG. 4 is an enlarged cross-sectional view taken on line 4—4 of FIG. 1 of one embodiment of plastic sheet used to form the cover of this invention;

FIG. 5 is a view similar to FIG. 4 showing the central portion of a plastic sheet raised to facilitate withdrawal of air from under the cover, or drainage of water on the surface of the cover;

FIG. 6 is an enlarged cross-sectional view of an alternate embodiment of plastic sheets used in the cover of this invention;

DETAILED DESCRIPTION OF THE INVENTION

Figure 1:
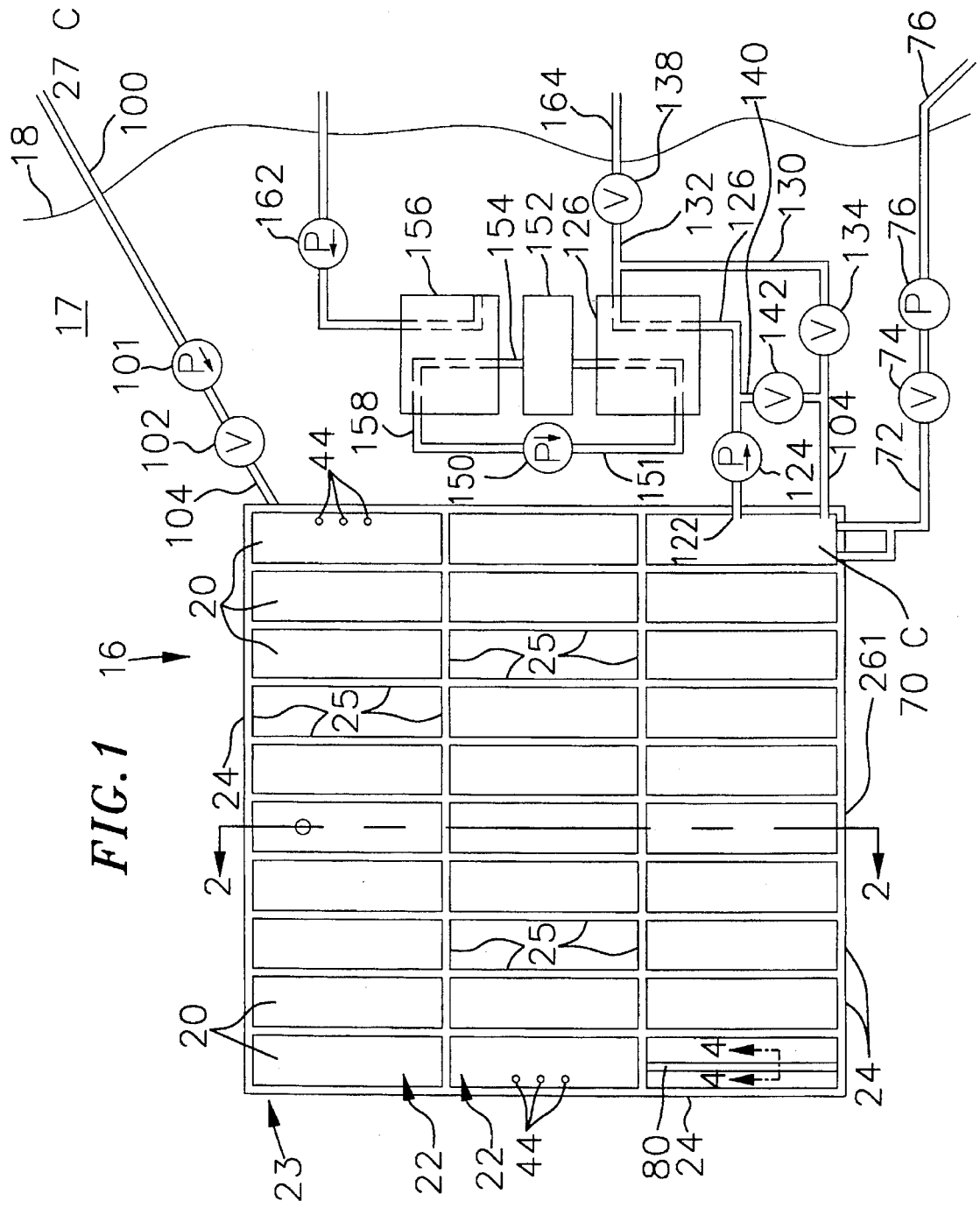
FIG. 1 is a schematic plan view of a pond and energy recovery system using covers of this invention.

Referring to FIGS. 1 and 2, a solar heating plant 16 is on a beach 17 near a shoreline 18 of an ocean, sea, or other appropriate source 19 of water, which preferably has a surface water temperature of about 80° F. (27° C.), and extends abruptly down to a depth of greater than 2000 feet, where the water temperature is about 44° F. (6° C.). A separate horizontal cover 20 is disposed over each of thirty elongated, rectangular ponds 22, disposed in a substantially square array 23 of ten rectangular ponds in each of three rows. As shown in FIG. 1, each pond is about four times as long as it is wide. By way of example, the thirty ponds cover an area of about 150 acres, which is about 2,720 feet wide by 2,780 feet long. Each pond is about 250 feet wide and about 900 feet long.

The array of ponds shown in FIG. 1 is surrounded by an external berm 24, and adjacent ponds in the array are separated by inside berms 25. Thus, the berms form upwardly extending edges which surround the ponds.

As shown in FIG. 2, each external berm 24 has a downwardly and outwardly sloping outside bank 26, which extends from the top of the berm down to the surrounding natural ground level 28. The outside bank slopes downwardly at least one vertical unit of distance for each five horizontal units of distance. Each berm has an inside slope 30, which extends downwardly and inwardly into a respective pond at a rate of about one unit of vertical distance for each two units of horizontal distance, where soil conditions permit efficient excavation to obtain that configuration. Each berm is about twenty feet wide, and each berm has a respective elongated convex crown 31 formed in the center of the top of each berm. Each crown extends for the length of the berm on which the crown is formed. The covers lie in a common horizontal plane between about six to about twelve inches below the crests of the crowns, which also lie in a common plane. Each crown slopes downwardly and outwardly at a rate no greater than about one vertical unit for each five horizontal units. The lower portion of each inside berm terminates at a substantially horizontal pond bottom 32. Preferably, the inside slope of each berm and the bottom of each pond is covered by a water-impermeable liner 33 (FIG. 3). Each pond is about ten feet deep, and preferably built on two feet of dry, well-drained soil for good heat insulation.

Each cover includes a relatively thin horizontal sheet 34 (FIG. 3) which is impermeable to air and water, transparent to visible solar radiation, and yet substantially opaque to longwave infrared radiated from warm water under each cover.

The cover sheet can be made of any suitable material, such as a film of low-density polyethylene polymer, which is widely used for swimming pool covers. Other polymers which can be used to make the sheets include polypropylene, polyvinylchloride, and polyvinylidene chloride. Many other thermoplastic plastic polymers can be used to impart various desired qualities to the cover sheet, either alone or in combination with other polymers, including: medium-, high-, and ultra-high-density polyethylene, polyvinyl carbonate, polyvinyl chloride, polyvinyl fluoride, polyvinylidene chloride, chlorinated polyvinyl chloride, chlorinated polyethylene, ionomer (Surlyn), polyester (Mylar), and those polymers sold under the trademarks of Nylon, Aclar, Acrylic, Tedlar, Lexan, Kapton, Saran, and Teflon (polytetrafluoroethylene).

Some polymers, Such as low-density polyethylene, adapt easily to forming cover sheets, especially those which include two parallel films bonded together to form air bubbles between the films. Other polymers, such as Teflon, are difficult to vacuum-form and heat-bond, at least at convenient temperatures. For example, pressure/heat-forming Teflon requires a film temperature of about 475° F., and a mold temperature of between 200° and 300° F.

U.S. Pat. No. 4,426,995, issued Jan. 24, 1984, to Wilson, discloses manufacturing a plastic sheet by combining two films of plastic with different qualities for heating water and other uses. The two films form a multiplicity of isolated gas-tight and air-filled compartments to provide a thermal insulation barrier. Such sheet is commonly referred to as "bubble film". Wilson's top film is of a material or combination of materials selected to have high solar energy transmission qualities, while the lower film is selected from materials or combinations of materials that absorb solar energy and conduct the heat downward into the water to be warmed. Downwardly extending projections with high thermal conductivity are placed on the bottom sheet to conduct heat energy into the receiving media.

The preferred sheet 34 in the cover of this invention is made of a thin, yet strong, top film 36 (FIGS. 3, 4 and 5), such as Teflon, laminated onto a bottom film 38, such as polyethylene, with downwardly extending air-filled compartments 39, which lie partly submerged in a body of water 40 in each pond, and provide insulation against heat loss from the ponds. Transparency of the cover to infrared radiation is a function of the total accumulative thickness of all sheets in a cover configuration. The top and bottom sheets are bonded together in flat areas (lands) 42. Preferably, a plurality of check valves 44 are bonded in some of the lands so that the lower end of each check valve is flush with the bottom surface of the bottom film of the sheet 34. The check valves permit air (or water, as explained in more detail below) to flow upwardly through them, but prevent air or water from flowing downwardly.

Transparency to solar energy (or "transmittance") depends upon the material used and the total thickness of the cover sheet, each of which determines the amount of energy absorbed by the sheet. The amount of undesirable absorption of solar energy increases exponentially with the thickness of the material. Therefore, thinner sheets can transmit greater amounts of solar energy than thicker sheets. Thus, the thinner the total thicknesses of the sheets in the cover, the better the energy transmission from the sun into the pond. The preferred embodiment of this invention includes the use of film polymeric materials that have high solar energy transmission, coupled with high strength at the working temperatures of the pond, thereby allowing for thin film thickness. For example, a 0.5 mil film of linear Teflon provides as much as 97% solar energy transmission, and yet has high tensile strength and high resistance to infrared radiation. Other polymers that are opaque to infrared radiation include acrylic, fiberglass, polyvinyl carbonate, and Tedlar. The working temperature of the water in the pond can be between 150° F. (66° C.) and 200° F. (93° C.). Polymeric materials, such as low-density polyethylene and polyvinyl chloride, have upper operating temperature limits of about 160° F. (71° C.), while chlorinated polyvinyl chloride has an upper limit of about 200° F. The upper limit for Teflon is greater than 400° F. (204° C.).

The strength of the films in the cover depends upon thickness and tensile strength of the material used. Weaker materials, such as polyethylene, have a tensile strength of about 3000 psi at ambient temperatures, and much lower at the working temperatures of the pool. Stronger materials, such as linear Teflon and biaxially oriented polypropylene, have tensile strengths of 40,000 psi. Very thin films made from stronger materials pass considerably more solar energy than do thicker films of weaker materials. However, even when the thin cover sheets are made with strong materials, they are still subject to damage, such as puncture and tear, especially in environments subjected to tropical storms where wind velocities can exceed 100 miles per hour. Thus, the aerodynamic qualities of the cover and pond assembly are important because of the high wind velocities experienced in the tropics and other areas. The cover must not tear or blow away under such conditions. The configuration of the outside banks, and the location of the tops of the berms and the horizontal covers in substantially the same horizontal plane minimizes the possibility of aerodynamically-induced damage. The reason for this is that drag forces across a flat, smooth sheet of plastic, such as used in the cover, are small, even with high wind velocities. However, upward and downward forces accompany high wind velocities when wind eddy currents develop. Such forces may occur due to an eddy formed as the air passes over shore-based structures, such as the pond berms. At high wind velocities eddy currents form tending to cause the cover to lift free from the water, unless it is firmly anchored and has sufficient strength to withstand the tension imposed by the lifting forces.

It is important that during times of high wind velocity there not be any structures rising a significant distance into the airstream to cause eddy currents or other forms of turbulence in the air passing over the pond cover. For this reason, the pond berm and cover are constructed so they are substantially co-planar to prevent air-foil effects that would create destructive lifting forces. The gentle slope of the crowns on the berms and of the outside banks of the external berms reduce eddy effects from winds blowing across the array of ponds. As explained below, eddy currents over the pond array are minimized during high wind conditions by flooding the top surfaces of the covers with a layer of water 6–12 inches deep so the top surface of the water is at the same level of the crests of the berms.

As shown best in FIG. 3, the outer edge or periphery of each cover sheet 34 is clamped by an elongated, curved restraining plate 50 against a convex inner face 52 on one side of an upwardly opening, elongated channel 54 formed in the upper surface of an elongated concrete curb 56 cast along each side of a respective berm which faces a respective pond. The restraining plate is held in position by longitudinally spaced wedges 58, each having a concave surface 60, which bears against the convex side of the curved restraining plate 50. The lower end of an upwardly extending bolt 62 is embedded in the concrete curb under the channel 54 and extends up through a bore 64 in the wedge. A nut 66 threaded onto the upper end of the bolt holds the wedge down firmly against the restraining plate so that the cover sheet is firmly clamped and sealed to the concrete curb, which extends around each pond. As the wedge is forced into the clamping position by tightening nut 66, the cover sheet is placed in tension so that it is anchored in tension and sealed around its entire periphery to the concrete curb. The restraining plates 50 extend for the entire length of the respective channel in which they are disposed so that the cover sheet is clamped to and sealed against the concrete curb around the entire periphery of the sheet. Thus, the space between the cover bottom and the surface of the water in the reservoir is hermetically sealed from the atmosphere. This is important in keeping the air or wind from entering below the sheet and lifting it off the water.

A plurality of water lines 70 extend from the bottoms of the channels 54 to a main water line 72 (FIG. 1), which is connected through a control valve 74 and a reversible pump 76 to a line 78 which extends from shore into the sea. When high winds are expected, the channels are quickly filled by opening valve 74 and pumping sea water through line 72 into the channels and up past the wedges to flood the top surface of the cover sheets with a layer of water between about 6" and about 12" deep, depending on the height of the crowns on the surrounding berms. This causes the level of the water in the ponds to be substantially the same as that of the berms to minimize eddy currents which might develop in high winds and tend to damage the covers. As explained below, the flooding of the top surfaces of the covers can be supplemented with, or done entirely by, raising the level of the water in the ponds so that water and air flow up through the check valves in the covers.

Referring to FIG. 4, which is taken on line 4—4 of FIG. 1, an elongated inflatable tube 80 of thin film is bonded, or otherwise suitably attached, to the bottom surface of bottom film 38 of the cover sheet. A valve 82 is sealed through the top film 36 and opens into tube 80, which can be inflated or deflated through a line 84 (FIG. 5) connected to the valve 82 and a reversible blower 86, which can supply air to, or remove air from, the interior of tube 80. FIG. 5 Shows the tube 80 in the inflated position to facilitate draining water from the top surface of the cover and into the surrounding channels 54 after stormy weather has passed, and to restore the cover to its condition of maximum efficiency for transmitting solar energy into the water under the cover. One or more valves 87, connected by a line 88 to a reversible blower 90, can be used to remove air in the space between the cover sheet 34 and the water surface 184. Once the layer of water has drained from the top of the cover, evacuating the air space between the surface of the water in the pond and the bottom film 38, and at the same time evacuating the air in tube 80 through reversible blower 86, expedites the collapse of tube 80 back to its original flat position shown in FIG. 4. Evacuation of air from the space between the bottom surface of the bottom film and the surface of the water creates a reduced pressure so that atmospheric pressure tends to hold the sheet firmly against the water surface, even under stormy conditions. This evacuation can be expedited by doing it with tube 80 inflated which causes the cover sheet to lift off the water adjacent it, thereby form channels on either side of the inflated tube to facilitate evacuation by blower 90. When sufficient air has been removed from under the cover sheet, the inflated tube 80 is deflated, and the entire cover sheet rests upon the water surface and is firmly pressed against the water by atmospheric pressure. The buoyancy of the air-filled compartments holds the bottom surfaces of the lands 42 slightly above the surface of the water to form low-pressure dead air space 99 between the bottom of the cover and the water surface to provide additional insulation against heat loss from the pool. If needed for optimum spacing of the cover above the pond surface during normal operating conditions, air can be injected under the cover through valves 87.

Referring to FIGS. 1 and 2, the ponds are filled with warm sea water (say, at about 27° C.) through a sea surface water intake line 100, which extends from just below the sea surface through a filling pump 101 and a valve 102 into filling lines 104 each of which terminates in one or more upwardly extending jets or nozzles 106 near the bottom of a respective pond. For simplicity, only one such nozzle and filling line is shown in FIG. 2. The ponds are filled to the level shown in FIGS. 2 and 3 so that the downwardly extending bubbles of the bottom film on the cover sheet are about half submerged. The check valves 44 (FIGS. 1 and 3) in the covers permit air to be expelled as the ponds fill with water. Once the ponds are filled to the desired level, filling pump 101 is turned off, and filling valve 102 is closed.

The air spaces in the bubbles or compartments 39 between the films, and between the bottom of the cover sheet and the pool surface, are important to obtaining high thermal resistance because entrapment of air in nonconvecting cells provides resistance to thermal energy flow from the warm pond water to the outside air. The greater the thickness of unconvecting air, the greater the thermal resistance or "R" value. For example, unconvecting air provides an R value of 5 for each inch of thickness. Accordingly, air space between films, and between the bottom of the cover and the pond surface, is desired because small pockets of air captured between the films act as barriers to thermal convection. The bubble-film traps air in discrete bubbles, and a cover with several layers of bubbles (discussed below) provides a considerable added thickness of air for better insulation.

Once the filled ponds are heated to operating temperature, say, 150° F. to 175° F. hot water is removed from the upper portions of the ponds by a plurality of hot water lines 120 (only one of which is shown in FIGS. 2 and 3 for simplicity) which extend from respective upper portions of the ponds to an insulated hot water collection line 122 (FIG. 1), which is connected to a hot water pump 124. Hot water from pump 124 flows through a warm-side heat exchanger 126 via an insulated hot water supply line 128, the discharge end of which is connected to a warm water return line 130 and a warm water discharge line 132. A control valve 134 in the warm water return line 130 regulates the return of warm water to the ponds through filling lines 104. Alternatively, warm water from the warm side heat exchanger can be discharged into the sea through warm water discharge line 132 and discharge valve 138.

The water at the surface of the ponds tends to be considerably warmer than that at the bottom. Therefore, the water in each pond is mixed by circulating the water through the warm side heat exchange or, if the heat exchanger is not in use, by circulating it from hot water pump 124 through a bypass line 140 and a bypass valve 142 to filling lines 104. Mixing can also be achieved by injecting air bubbles along the bottom of the ponds to cause upwelling, or by slow-moving propellers (not shown) at several locations throughout the ponds.

A recirculation pump 150 (FIG. 1) pumps liquid ammonia, or other suitable working fluid, through the warm side heat exchanger 126, which evaporates the liquid ammonia into high-pressure gas, which flows through a turbine 152, which drives an electrical generator (not shown). The hot ammonia gas flows from the turbine through a line 154 through a cool-side heat exchanger 156, where the hot ammonia gas is cooled and condensed to a liquid, which flows through a return line 158 to the inlet side of the recirculation pump 150.

Deep cold sea water from a depth of between about 2000 feet and about 3000 feet at a temperature of about 44° F. is supplied through a deep ocean cold water pipeline 160 and a cold water pump 162 to the inlet side of the cool-side heat exchanger 156 where the hot ammonia gas is cooled to the liquid state. As the ammonia gas condenses in the cool-side heat exchanger, a low pressure is created, providing a large pressure difference between the hot and cold sides of the turbine. Warmed sea water flows from the discharge side of the cool-side heat exchanger 156 through a line 164 to return to the surface of the ocean. The deep ocean cold water pipeline can be of any suitable construction. For example, it can be made and installed as disclosed in U.S. Pat. No. 4,929,124, issued May 29, 1990, to Lockwood. The inlet end of the deep ocean cold water pipeline is preferably at a depth between about 2000 and about 3000 feet.

Makeup water is added to the ponds through the surface water intake line from time to time, as needed. Gases sometimes tend to accumulate under the cover due to outgasing from the sea water as it is heated. If permitted to accumulate, those gases could create air pockets which could endanger the cover during high-wind situations. With this invention, the subatmospheric pressure in the void between the water and the cover removes such gases. Moreover, the check valves 44 permit gases to be expelled as the cover and pond surface move relative to each other during operation of the system. In effect, such relative movement acts as a pump which automatically evacuates the air space between the bottom surface of the cover and the surface of the water in the ponds until the external atmospheric pressure is balanced by the buoyancy provided by the bubbles formed between the two films of the cover sheet.

Referring to FIG. 6, an alternate embodiment of a pond cover 170 includes an upper sheet 172 and an identical bottom sheet 173. The two sheets are bonded together around their peripheries. The upper sheet includes an upper film 174 bonded at lands 175 to an embossed bottom film 176 which has downwardly extending bubbles 178 to form air compartments 179, which rest on the top surface of a plain upper film 180 of the bottom sheet. An embossed bottom film 182 of the bottom sheet is bonded to the undersurface of the upper film 180 of a bottom sheet. The bottom film 182 of the bottom sheet has a plurality of downwardly extending air bubbles or air compartments 183, which float on the surface of the surface 184 of the water in a pond.

The advantage of the cover shown in FIG. 6 is that it provides additional air pockets for increased thermal insulation, compared to the single sheet cover of FIGS. 4 and 5. Moreover, the use of several sheets with relatively small bubbles works better than only one or two sheets of larger bubbles because air within the larger bubbles transmits more heat by convection than air within the smaller bubbles.

In addition, the air-water contact with the bubbles extending down into the water increases with decreasing bubble size. For example, a sheet with bubbles 1/8" in diameter has 8 times the air-water contact as a sheet with bubbles 1" in diameter and enclosing the same volume of air.

Figure 7:
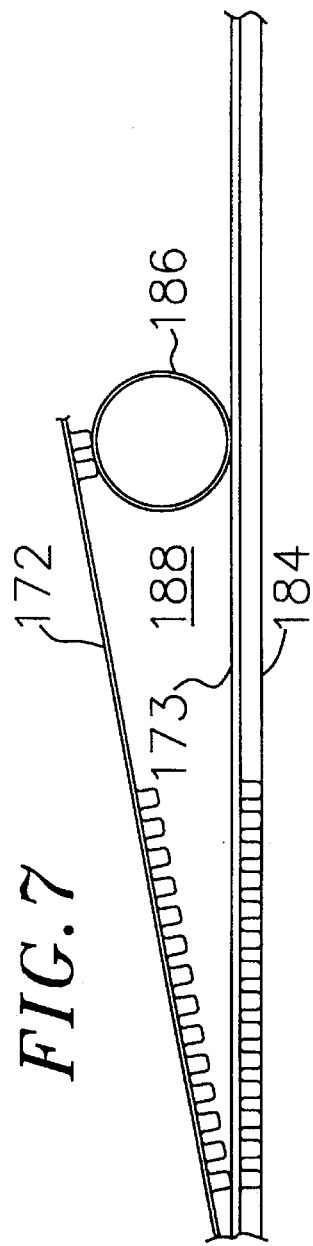
FIG. 7 is an enlarged cross-sectional view of another embodiment of plastic sheets used to make the cover of this invention.

The cover shown in FIG. 7 is similar to FIG. 6, except that an inflatable tube 186 of thin film polymer material is bonded between the top and bottom sheets 172 and 173 so that when the tube 186 is inflated, an additional air cavity 188 is formed between the two sheets in a tent configuration, thereby providing additional entrapped air for thermal insulation.

Figure 8:
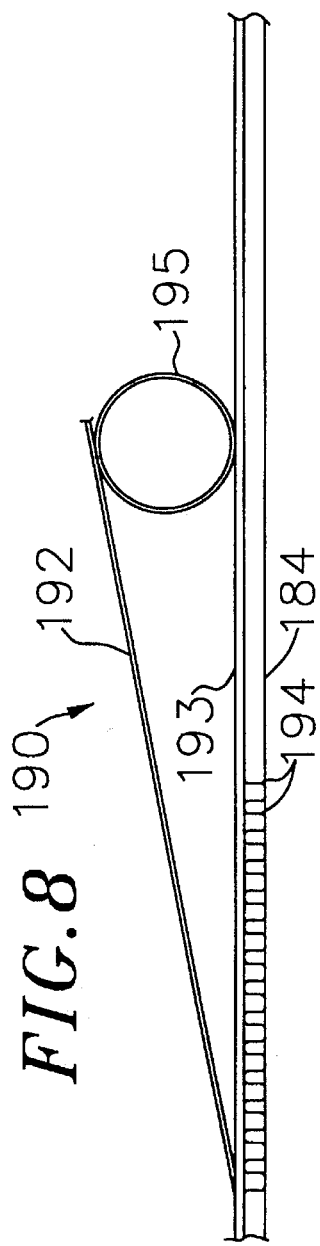
FIG. 8 is yet another enlarged cross-sectional view of plastic sheets used to make a cover in accordance with this invention.

In the embodiment shown in FIG. 8, a cover 190 includes a plain top film 192 bonded around its periphery the upper surface of a bottom sheet 193, which has downwardly extending bubbles 194 formed as previously described, and which float in the surface of the water of the pond. An inflatable thin-film tube 195 is bonded between the upper film 192 and the lower sheet 193. The cover shown in FIG. 8 is similar to that of FIG. 7, except that in FIG. 8 the upper sheet is a plain film without bubbles, thereby providing the same air entrapment with less total film thickness.

Figure 9:
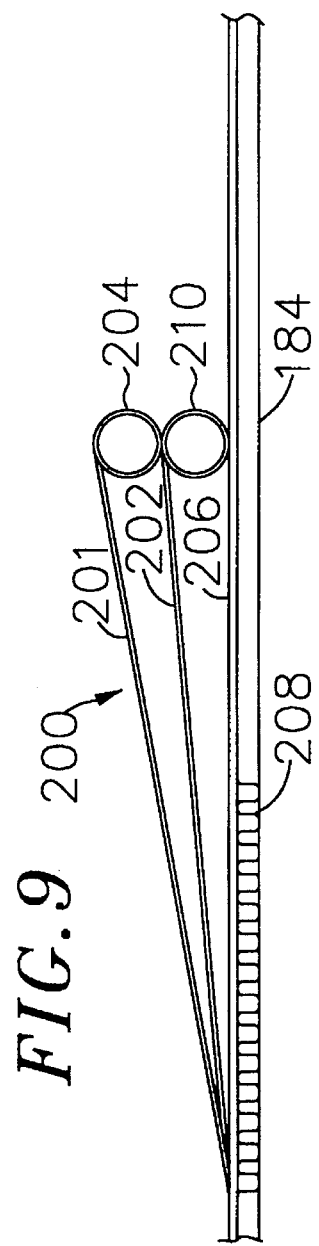
FIG. 9 is an enlarged cross-sectional view of another arrangement of plastic sheets used to make the cover of this invention.

FIG. 9 shows a cover 200 which includes a top film 201 bonded at its periphery to the periphery of an intermediate film 202, which is separated from the top film by an elongated upper thin-film tube 204. The periphery of the intermediate film 202 is bonded to the upper surface of a bottom sheet 206, which includes downwardly extending air-filled bubbles 208. A lower elongated thin-film tube 210 is bonded between the intermediate film 202 and the upper surface of bottom sheet 206. When the two tubes are inflated, as shown in FIG. 9, they provide the same amount of air gap as that available with the cover shown in FIG. 8, but provide a second barrier (the intermediate film 202) to reduce heat loss due to convection.

The covers of FIGS. 7, 8, and 9 may be modified by eliminating the inflated tubes, constructing airtight bonds around all edges between the films, and providing means for injecting low-pressure air into the space between the films in the sheets to hold the films apart.

The sheets in the covers described above can be made using standard bubble-film technology, which produces strips of bubble-film sheets (e.g., sheets made of two films bonded together with air bubbles trapped between) in widths of 4, 6 and 8 feet. This is a convenient size to handle when covering the large pond areas, and when it is impractical to handle wider sheets. For example, adjacent strips of bubble-film sheets are joined together in the field at the solar heating plant site to form a roll which is wide enough to extend across the width of a pond, say, about 270 feet wide. In the joining process, the sheets should not be weakened. Field seaming techniques include heating, thermoplastic hot melt (extrusion welded joints), electromechanical induction heating, radiofrequency induction, ultrasonic, solvent adhesive, and sewing. The seams should be as strong as the material itself. The seams must not peel and must have a low aerodynamic profile. For example, all overlapping edges are sealed tight without flaps or cleavage between the sheets so that wind does not enter beneath a flap to tear it loose, or cause any disturbances to the otherwise smooth flow of air across the cover. In some cases, reinforcing fibers (e.g., glass fibers and the like) are included along the longitudinal edges of the bubble film as the two sheets are laminated, thereby adding considerable strength to the finished product and providing strong seams between sheets.

Because bubble-film is bulky and lightweight due to bubble thickness, it is costly to transport. Accordingly, this invention provides for on site fabrication of the bubble-film and other structural configurations with strips of pre-rolled films at the plant site. For example, trailer-mounted rollers and ancillary equipment, along with portable electrical and steam generators, are used to produce tailor-made sheets for assembling the covers of this invention at the plant site.

High resistance to ultraviolet (UV) radiation is essential for long cover life and, therefore, greatly affects the cost to produce warm water. Many polymers deteriorate in sunlight. With some polymer formulations it is possible to add compounds that inhibit and slow down UV-induced degradation of the film. Polyethylene films, even with ultraviolet radiation damage inhibitors still have a life of only one year in the intense tropical sunlight. In contrast, no detectable degradation in tensile strength has been observed with Teflon in over fifteen years of solar exposure in Florida. Accordingly, Teflon is one of the preferred materials for the films used in making the covers of this invention.

The preferred embodiments of the covers also include several polymers that collectively provide the necessary qualities, including, for example, high tensile strength and tear resistance at the operating temperatures by using a lightweight fabric or the inclusion of polymeric or glass fibers; the desired solar transparency with infrared resistance, coupled with low water and low air permeability in a copolymer backing film. The embossed film preferably is easily temperature-formed in the field, solar transparent, and with low air and water permeability. The backing film is a strong, thin, solar-transparent, and I.R. resistant material, such as Teflon, laminated to a very thin film of high-density polyethylene or CPVC for bonding at lower working temperatures. In another embodiment, fibers or fiber fabrics are placed in a sandwich of two laminated films to impart high strength at the higher temperatures and high-strength seams. Polymer fibers may also be used to impart desired long wave radiation resistance while providing high transmission to solar energy.

The above material qualities relative to solar energy transmission, resistant to radiation of IR, thinness and strength, compatibility with field bonding and forming techniques, life, and overall economics determine which polymers, polymer mixes, or laminates, of many possible candidates are used.

The structural design of the bubble-film is important to obtain high thermal resistance because the entrapment of air in nonconvecting cells provides the resistance to thermal energy flow from the warm pond water to the outside air. Still air is an excellent thermal insulator. The greater the thickness of unconvecting air, the greater the thermal resistance, or "R value". (The reciprocal of R is the overall coefficient of heat transfer, "U", measured in BTU per hour per square foot of surface area per °F. across the material. In other words, U equals 1 over R. At an R value of. 10, U is 0.1 BTU/hr/ft$^2$/°F. Unconvecting air provides an R value of 5 for every inch of thickness. Accordingly, as much dead air space as possible between films in the cover is desired because small pockets of air act as barriers to thermal convection. Bubble-film traps air into discrete bubbles, and a cover with several layers of bubbles provides considerable additive thickness of air due to the air pockets. Because of the large temperature differences between the solar heated pond water at the bottom of the cover and the outside air temperature at the top, the solar pond situation provides strong thermal driving forces to cause convection within large air bubbles. The greater the temperature difference across an air bubble, the greater the driving force for convection. Therefore, several layers of bubbles are desirable in contrast to a single layered cover standing at a fixed height off the pond water, since the temperature difference across each cell is greatly reduced. Several layers of air cells separated by film mitigate the formation of convection cells.

While a multilayered blanket of considerable thickness is the ideal for thermal resistance, additive film thickness in a cover absorbs solar energy. Therefore, the preferred embodiment of the cover of this invention minimizes film thicknesses to optimize solar transmission, while also providing relatively thick layers of trapped air.

The presently preferred embodiment includes several layers of one-quarter-inch-thick air pockets with the strongest possible polymer to allow the use of very thin films. In practice, one thicker and unformed backing film (such as Teflon) provides the strength or tension member sheet in a cover, with one or more other films bonded to the tension member to provide entrapped air. Alternatively, a film of linear low-density polyethylene provides an 8-mil backing (as the tension or backing member) with a 4-mil polyethylene film that is vacuum formed to provide air pockets about ¼" deep. This material, floating with the bubble side down, provides an R value of about 3, with a solar energy transmission of 85%. The total average film thickness, considering the stretched-out bubble wall, is 10 mils or less.

In the preferred embodiment of this invention, the bottom of the air-filled bubbles in contact with the water causes considerable suction forces with the water due to surface tension and capillary effects around the circumference of the bubble at the water-film interface. Thus, a considerable upper force is required to break the bubble-film free from the water surface. A large number of bubble contact surfaces partially submerged in the water due to the meniscus effect on the plastic bubble provide a strong connection between the cover and the water.

Reducing the pressure of the air trapped between the cover and the water surface of a pond greatly aids in resisting damage caused by wind-induced uplifting forces. However, even a downward pressure on one part of the cover can force air to move to other locations where there are slight uplift pressures. This translocation of air can cause the bubble-film to break away from the water of the surface. In this case, a wind wave forms that moves in the direction of the wind, as happens with a water wave that has a free upper surface. As eddy currents pass across the pond cover, a wave crest is formed by the low-pressure eddy on top of the cover, with air beneath the cover being borrowed from areas under the cover where a low or negative air pressure exists. As long as there is not excessive air trapped under the cover, the upward suction at the wave crest results in a downward depression at the wave trough from which the air is being borrowed. With a ⅞"-deep bubble-film, the maximum depth of this trough could be only ⅞" deep (or the depth of a first bubble-film sheet). So the available air to fill the wave crest is limited and thereby becomes limits to the wave height. Even if the cover pulls completely up to be temporarily free from the water in the area of the wave crest, the amount of air available to allow it to pull completely free for any appreciable distance is limited by the subatmospheric pressure of air in the space between the cover and the water surface.

Moreover, the check valves 44 extending through the cover provide one-way air passages for continuous pumping of air and other gases from the space between the cover and the water surface as the latter two elements move vertically relative to each other. This reduction of the pressure in the continuous air channels between the bubbles adds to the suction effects of the bubbles in coupling the cover to the water surface. By keeping the void space between the cover and the water surface partially evacuated with the check valves, or blowers, or the like, the bubbles are pushed deeper into the water, thereby increasing the surface area between the plastic bubble and the water, and the downward force of the atmosphere on top of the cover. In addition, there is less air available to rush into low-pressure areas described above.

We claim:

1. A cover for withstanding stormy weather and increasing solar heating of a body of water in a reservoir having a bottom and a side edge extending upwardly from and surrounding the bottom, the cover comprising:

a) a sheet disposed over the body of water, the sheet being more transparent to visible radiation from the sun than to infrared radiation;

b) means for anchoring the sheet in a substantially horizontal plane down around its periphery to the side edge of the reservoir to prevent wind from lifting the sheet from the reservoir;

c) means forming a retaining wall extending above and around the periphery of the sheet;

d) means for covering the top of the sheet with a layer of water and holding the water on the sheet at a level substantially the same as the top of the retaining wall; and e) means for drawing water from the top of the sheet.

2. A cover according to claim 1 in which the sheet and top of the side edge lie substantially in the same horizontal plane.

3. A cover according to claim 2 in which the side edge of the reservoir is in the form of a berm, and which includes an elongated crown on top of the berm and projecting above the horizontal plane of the sheet to form the retaining wall.

4. A cover according to claim 3 in which the crown slopes upwardly and away from the body of water at a rate of no more than one unit of vertical height for each four units of horizontal distance.

5. A cover according to claim 1 which includes a vent for letting gas flow from space between the cover and the surface of the body of water.

6. A cover according to claim 5 in which the vent extends through the cover, and which includes a check valve in the vent for permitting fluid to flow up through the vent and for preventing fluid from flowing down through the vent.

7. Apparatus according to claim 5 or 6 which includes means for withdrawing gas from under the cover to create a subatmospheric pressure in space between the cover and the top of the body of water.

8. A cover according to claim 1, 2, 4, 5, or 6 which includes an upwardly opening channel disposed around the cover and having a bottom below the substantially horizontal plane of the sheet, and means for flooding the channel with water to an overflowing condition so the water covers the top surface of the cover.

9. A cover according to claim 6 which includes means for lifting the sheet to an elevated condition above the body of water, and means for withdrawing air from the space between the cover and the body of water.

10. A cover according to claim 9 which includes means for lowering the sheet.

11. A cover according to claim 1 which includes an elongated upwardly opening channel in the edge surrounding the reservoir, and clamping means for anchoring and sealing the sheet to the channel.

12. A cover according to claim 11 in which the channel includes an elongated, upwardly opening, convex surface facing away from the reservoir, the sheet being disposed over the convex surface, and an elongated curved clamp disposed on the sheet to hold it against the convex surface of the channel.

13. A cover according to claim 12 which includes a plurality of longitudinally spaced wedges disposed in the channel for holding the curved plate against the sheet.

14. A cover according to claim 13 which includes a plurality of upwardly extending and longitudinally spaced bolts in the channel, each bolt having its lower end anchored in the bottom of the channel, each bolt passing up through an opening in a respective wedge, and a separate removable nut threaded onto the upper end of a respective bolt for holding a respective wedge in a clamping position.

15. A cover according to claim 1, 2, or 3 in which the side edge around the reservoir is above ground level, and in which the side edge includes a downwardly and outwardly sloping outside bank which has a slope of no more than one vertical unit of distance for each four units of horizontal distance, the bank extending outwardly to terminate approximately at ground level to minimize aerodynamic forces on the cover when subject to high wind conditions.

16. A cover according to claims 1 or 2 in which the side edge of the reservoir includes an inside slope which extends downwardly and inwardly at a rate of about one vertical unit for each two units of horizontal distance.

17. A cover for increasing solar heating of a body of water, the cover including a first sheet, a second sheet bonded around its periphery to the first sheet, a first elongated inflatable tube disposed between the first and second sheets, a third sheet bonded around its periphery to the peripheries of the first and second sheets, and a second elongated inflatable tube disposed between the second and third sheets.

18. A cover according to claim 17 in which the third sheet includes hermetically sealed compartments filled with gas extending away from the first and second sheets and adapted to float on the surface of the water.

* * * * *